April 21, 1931. J. W. LEIGHTON 1,801,435
SPRING SUSPENSION
Filed Nov. 4, 1929
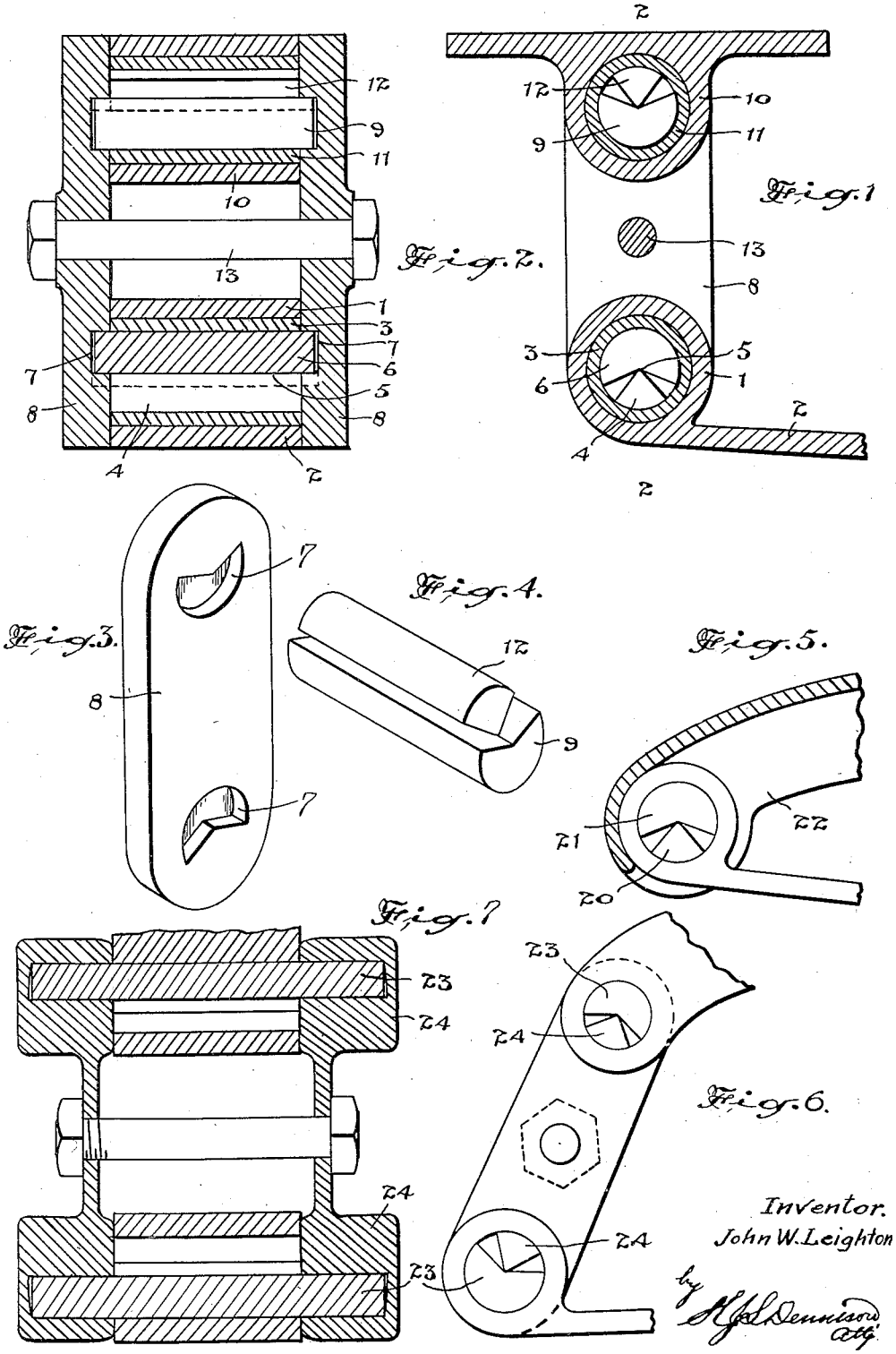
Inventor.
John W. Leighton Patented Apr. 21, 1931

1,801,435

UNITED STATES PATENT OFFICE

JOHN WYCLIFFE LEIGHTON, OF PORT HURON, MICHIGAN

SPRING SUSPENSION

Application filed November 4, 1929. Serial No. 404,658.

The principal objects of the invention are to devise a construction of bearing for spring suspensions which will materially reduce the wear and enable effective lubrication, thereby greatly enhancing the life of the bearing, and which will considerably reduce the cost of construction.

The principal feature of the invention consists in the novel construction of the spring suspension, whereby the load is supported by axially engaging members capable of relative oscillating movement arranged between the load supporting member and the spring support.

In the drawings, Figure 1 is a vertical mid-sectional view through the bearing supports of a spring shackle for a vehicle support.

Figure 2 is a vertical mid-sectional view of a spring bearing on the line 2—2 of Figure 1.

Figure 3 is a perspective detail of one of the shackle plates shown in Figure 2.

Figure 4 is a perspective detail of the axial bearing members for one end of the shackle.

Figure 5 is a sectional elevational view of a spring suspension with a direct connection to a frame.

Figure 6 is an elevational view of a further modification and Figure 7 is a sectional view through the spring bearing shown in Figure 6.

The common practice in spring suspension construction has been for many years to pivot the eye end of the spring upon a bolt held in a jaw-shaped frame structure, or between the members of the shackle and the frictional contact has been reduced by the use of anti-friction bushings, but even though much improvement has been effected in the methods of lubricating such bearings, there is a condition of very rapid wear resulting in loose parts and rapid deterioration.

The present invention proposes the use of a very old type of bearing in an entirely new arrangement and is an adaptation of the "knife edge" bearing used in scale construction.

In the form of application of the invention illustrated in Figures 1, 3 and 4 the invention is shown in relation to a spring shackle.

The eye end 1 of the spring 2 has arranged therein an anti-friction bushing 3.

Arranged within the bushing and rotatably resting thereon is a block 4 in the form of a sector-shaped prism, the side walls of which preferably form an acute angle.

A sector-shaped bar 6, the convergent faces of which form an obtuse angle is rotatably mounted in the bushing 3 with its axial line resting upon the apex of the block 4.

The bar 6 extends beyond the side faces of the eye end 1 of the spring at either end and the projecting ends are imbedded in recesses 7 formed in the inner faces of the shackle bars 8, said recesses being preferably of a corresponding sector shape to the cross sectional shape of the bar. The bar is thus rigid with the shackle bars.

A bar 9, similar to the sector bar 6 is secured between the upper ends of the shackle and extends through the bearing block 10 which is secured to the vehicle frame or load carrying member, said block being here shown provided with a bushing 11 and a block 12 in the form of a sector-shaped prism similar to the block 4 has its apex resting in the upturned axial groove formed in the upper bar 9.

The shackle bars 8 are here shown secured in position adjusted against the ends of the spring eye 1 and bearing block 10 by a bolt 13.

It will be readily understood that the bars 6 and 9 may extend through the shackles and be provided with bolt ends to hold the shackles securely instead of using the central bolt 13.

The bushings 3 and 11 may be dispensed with if desired, as there is very little frictional contact between the outer arc-shaped surface of the central block 4 and the engaging cylindrical surface of the spring eye.

It will be seen that in a bearing such as described the vibratory movement of the spring and the swinging movement of the shackle will result in a relative movement about the axis of the sector-shaped bars 9 and 6 and the engaging sector shaped blocks 4 and 12, the result of which is that as the support of the load occurs at the axis of rotation of these members, there is very little movement. The provision of a "knife edge" bearing in a V groove at the axis of rotation allows the members to oscillate with the minimum of friction and wear.

It is noted that the angularity between the sides of the blocks 4 and 12 is considerably less than the angularity between the convergent side walls of the sector-shaped bars 6 and 9, consequently the block 4 arranged in the spring eye will have considerable latitude of oscillating movement, but in the event of extreme movement occurring in the spring such as to bring either of the longitudinal faces of the block 4 into engagement with the convergent faces of the bar 6, the bushing or inner surface of the spring eye will slip on the arc-shaped surface of the block.

The return movement of the spring will cause the block 4 to strike against the opposing face of converging bar 6 and it will thus be centralized.

It is important to note that as illustrated in Figures 1 and 2 the bars 6 and 9 are rigidly mounted in the shackles and the bar 6 rests upon the apex of the sector-shaped block 4, and as the block 4 is carried by the spring eye the load is supported by the contacting surfaces of the spring eye and block 4 and the peripheral surface of the bar 6 having clearance is free from frictional contact with the inner surface of the spring eye. Similarly at the upper end, the load is transmitted from the block 12 to the block 9 which is secured in the shackles carried by the bar 6, and there is no frictional contact between the block 9 and the load carrying block 10. This feature is important in respect to the operation as all normal rotating movement is borne on the "knife edge" bearing between the blocks 4 and 6 and 9 and 12 and this obviates the necessity of the accurate machining of the perimeter of the blocks 6 and 9.

At the upper end of the shackle the bar 9 oscillates in the bearing of the block 10 as it is rigidly connected with the shackle bars 8 and any extreme movement either backward or forward that will cause it to engage the angle faces of the block 12 will rotate said block in the same manner as the block 4.

The relative angles of the convergent faces of the bars 6 and 9 and the blocks 4 and 12 may of course be designed so that with the most extreme relative movement between the spring and the load carrying member the faces will not engage, consequently under such conditions it will not be necessary for the blocks 4 and 12 to rotate.

Figure 5 illustrates the application of the invention to the support of the spring eye directly upon the end of the frame of a vehicle.

The sector-shaped block 20 corresponds with the block 4 and the bar 21 corresponds with the bar 6, the ends thereof being secured in the frame 22.

It will be appreciated by those skilled in the art that the construction of a spring joint or support may be varied considerably while adhering to the principal feature of the invention.

It will also be readily understood that in a bearing such as described with openings extending from end to end between the sector-shaped members, lubrication will be very greatly enhanced as these openings can be packed with grease to permit the maintenance of a lubricant for an indefinite period.

In the form shown in Figure 6 the bars 23 are rotatably secured in the frame block and the spring end, and are similar in form to the bars 6 and one arranged with the convergent V shaped walls of the grooves turned toward each other. These bars project beyond the supports and the shackle ends which fit thereover are formed with acute sector-shaped bearing portions 24 to pivot axially on said bars.

What I claim as my invention is:—

1. A spring suspension comprising a sector shaped block, a block rockingly mounted on the apex of the aforesaid block and having a pair of convergent plane surfaces retaining said blocks in a fixed axial bearing contact, a spring supporting one of said blocks and a load carrying member supported from the other of said blocks.

2. A spring suspension comprising a sector shaped block, a block rockingly mounted on the apex of the aforesaid block and having a pair of convergent plane surfaces retaining said blocks in a fixed axial bearing contact, a spring having an eye rotatably encircling said blocks and supporting same, and a load carrying member supported from one of said blocks.

3. A spring suspension comprising a spring having an eye end, a sector shaped block arranged in said eye end and having a pair of convergent plane surfaces forming a groove, a sector shaped block having its apex held in axial bearing contact with the bottom of the groove in the aforesaid block, and a load carrying member supported by one of said blocks, the block supporting the load carrying member having its perimeter clear of contact with the spring eye and rocking on the axial support.

4. A spring suspension comprising a spring having an eye end, a sector shaped block arranged in said eye end and having a pair of convergent plane surfaces forming a groove, a sector shaped block having its apex held in axial bearing contact with the bottom of the groove in the aforesaid block, and a load carrying member rigidly secured to and supported by one of said blocks.

5. A spring suspension comprising a spring having an eye end, a sector shaped block arranged in said eye end and having a pair of convergent plane surfaces forming a groove, a sector shaped block having its apex held in axial bearing contact with the bottom of the groove in the aforesaid block, and a load carrying member recessed to receive and rigidly hold the ends of one of said blocks.

6. A spring suspension comprising a spring having an eye end, a sector shaped block arranged in said eye end and having a pair of convergent plane surfaces forming a groove, a sector shaped block having its apex held in axial bearing contact with the bottom of the groove in the aforesaid block, a pair of shackle plates recessed to non-rotatably hold the ends of one of said pair of blocks at each end of said plates, and a bolt extending between and securing said plates.

7. In a spring suspension, a spring having a cylindrical eye, and relatively movable bearing members fitted in said eye and contacting axially thereof, one of said members being grooved longitudinally, the walls of said groove presenting plane surfaces converging to a common axis and the other member being formed to present a longitudinal axial ridge contacting with the aforesaid member at its axis, the converging walls of said grooved member co-operating with said second member to retain said members in true axial contact and limit the movement of one relative to the other.

JOHN WYCLIFFE LEIGHTON.